Figure 1:
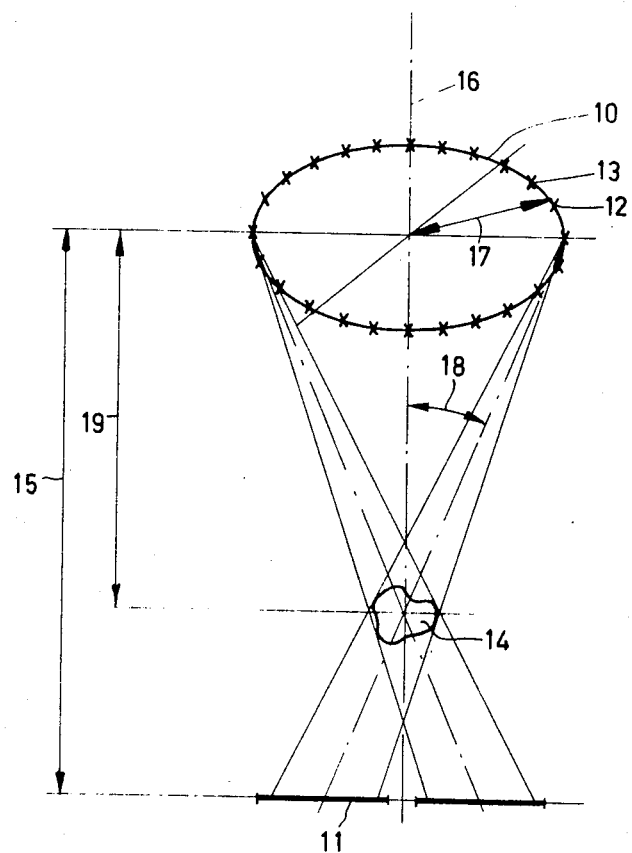

United States Patent
Kock et al.

[11] 3,843,225
[45] Oct. 22, 1974

[54] METHOD OF HOLOGRAPHICALLY FORMING A THREE-DIMENSIONAL IMAGE FROM A SEQUENCE OF TWO-DIMENSIONAL IMAGES OF DIFFERENT PERSPECTIVE

[75] Inventors: Manfred Kock, Norderstedt; Ulf Tiemens, Pinneberg, both of Germany

[73] Assignee: U.S. Philips Corporation, New York, N.Y.

[22] Filed: Apr. 4, 1973

[21] Appl. No.: 347,928

[30] Foreign Application Priority Data
Apr. 15, 1972 Germany ............................ 2218384

[52] U.S. Cl. ................................ 350/3.5, 250/313
[51] Int. Cl. .......................................... G02b 27/00
[58] Field of Search .................... 350/3.5; 250/313

[56] References Cited
OTHER PUBLICATIONS

Groh, Applied Optics, Vol. 10, No. 11, November 1971, pp. 2549–2550.

Kasahara et al., Japanese Jour. of Applied Physics, Vol. 8, No. 1, January 1969, pp. 124–125.

Groh et al., Applied Optics, Vol. 9, No. 3, March 1970, pp. 775–777.

*Primary Examiner*—Ronald J. Stern
*Attorney, Agent, or Firm*—Frank R. Trifari; Simon L. Cohen

[57] ABSTRACT

In a holographic method of forming a three-dimensional image from a sequence of two-dimensional images of different perspective, the individual images are time-sequentially imaged by means of a lens, while the original recording geometry is maintained. The images are holographically stored in an intermediate plane in a photographic plate or a corresponding material. The recording material is rotated in a given manner in accordance with the recording geometry of the individual images and the images are subsequently time-sequentially reconstructed and superimposed while the hologram is stationary but the reference wave rotates.

3 Claims, 5 Drawing Figures

METHOD OF HOLOGRAPHICALLY FORMING A THREE-DIMENSIONAL IMAGE FROM A SEQUENCE OF TWO-DIMENSIONAL IMAGES OF DIFFERENT PERSPECTIVE

The invention relates to a method of holographically forming a three-dimensional image from a sequence of two-dimensional images of different perspective.

Various methods of recording images of selected layers are known. The simplest method of imaging a layer is proposed by Ziedses des Plantes, Acta Radiologica 13 (1932), page 182. "Der Radiologe," 9 (1969), page 37, describes the possibility of sequentially displaying a number of individual layer images in a storage tube by way of a sequence of electronically stored X-ray images. X-ray images can also be superimposed by means of a system of imaging lenses, or by preceding reduction of the image by means of a wide-angle lens. This is described, for example, in "American Journal of Roentgenology" 105 (1969), page 903. A continuously variable display of the layers is then possible. It was demonstrated that corresponding results can also be achieved by means of holography ("Applied Optics" 9 (1970) page 775; German "Offenlegungsschrift" 1, 952,105; "Optical Communications" 4 (1971) page 1). These methods have in common that the X-ray images are holographically stored in a manner such that a three-dimensional image of the object is produced upon reconstruction by integration.

With the exception of the traditional tomography, producing only an image of a sharply defined layer of the object, all said methods operate according to the tomosynthesis principle, that is to say, superimposition of a number of discrete images which are recorded in different perspectives. The drawbacks of the known methods are of different nature. During the electronic treatment, the electronically stored X-ray images are stored in a storage tube with a predetermined shift with respect to each other. This shift is also effected purely electronically, so with a limited accuracy. Due to the low resolution and the limited bandwidth of electronic systems, layer images are obtained which are poor in contrast. In addition, only individual layer images can be formed, and it is substantially impossible to form images of inclined layers. The incoherent-light method has the drawback that a complex, expensive and comparatively unflexible system is required. It is particularly difficult to adapt the system to recording at different layer angles. The layer images have a low light intensity and are poor in contrast as a result of the nature of the method.

The known holographic methods have a comparatively large depth of focus which, however, is not utilized. This is achieved by means of very small hologram apertures. As a result, the individual images have substantial noise (granulation). In addition, the light efficiency is poor when the holograms are recorded. Moreover, the real images have to be reconstructed from the hologram. In the case of a spherical reference wave, a lens is required for the reconstruction. If, moreover, unfavorable image plane holograms are used, the reconstruction geometry will also be unfavorable as regards blurring.

The drawbacks of the known methods are avoided according to the invention in that the individual two-dimensional images are time-sequentially imaged by means of a lens, while the original recording geometry is maintained, the said images being holographically stored in an intermediate plane, by means of a fixed reference wave, in a photographic plate or a similar material which is rotated to a given extent in accordance with the recording geometry of the individual images, after which they are time-sequentially reconstructed and superimposed while the hologram is stationary but the reference wave rotates.

Using only one imaging lens, having a variable diaphragm and hence a presettable depth of focus, the X-ray images are focussed and imaged in the center of the detail of the object to be studied. The necessary depth of focus then corresponds to the depth of the object, so that the light intensity of the objective can be maintained at an optimum high value. For example, a sequence of X-ray images which are recorded from different directions can be stored in a hologram such that all images are correctly superimposed after reconstruction. Consequently, it is alternatively possible to record layer images of the object at a later stage, continuous variation of the location in the depth and the inclination of the layer then being possible.

The method incorporates all advantages of the incoherent methods, but avoids the drawbacks thereof such as the complex and unflexible system, the fixed layer angle and the low light intensity of the images. The method furthermore incorporates all advantages of the known holographic methods, but avoids unnecessary depth of focus, unfavorable image plane holograms, light losses and noise-rich individual images.

The invention and its advantages will be described in detail hereinafter with reference to an embodiment which is shown in the accompanying drawing.

Figure 2:
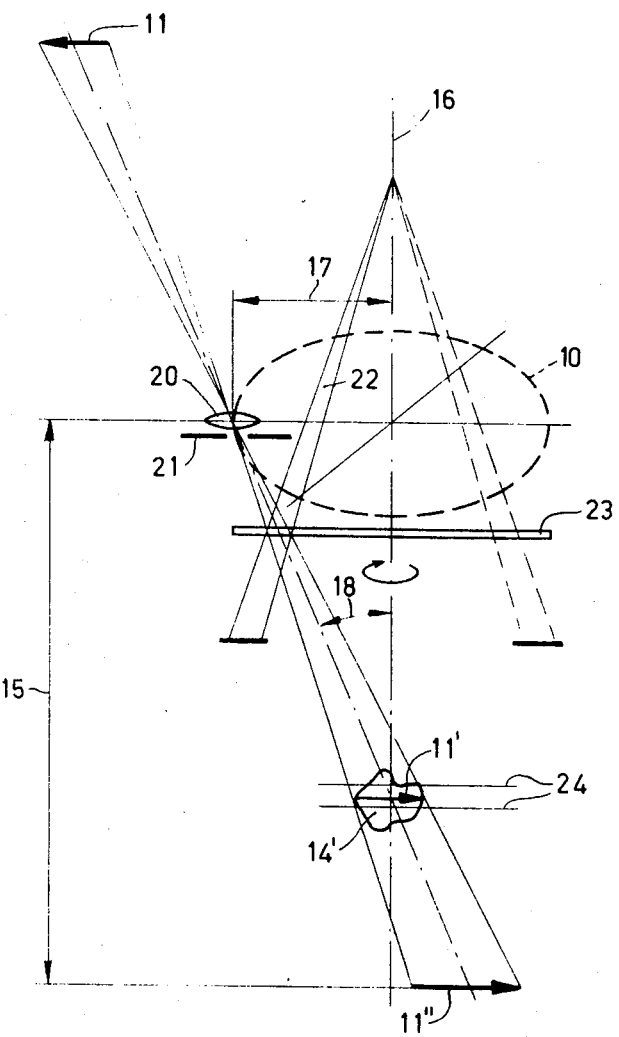
Figure 3:
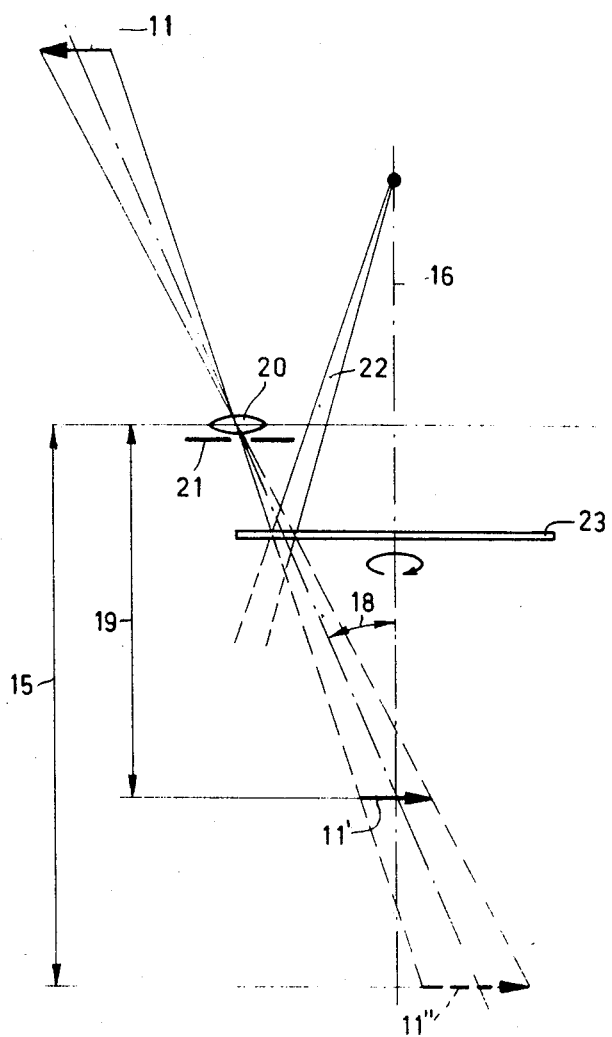
Figure 4:
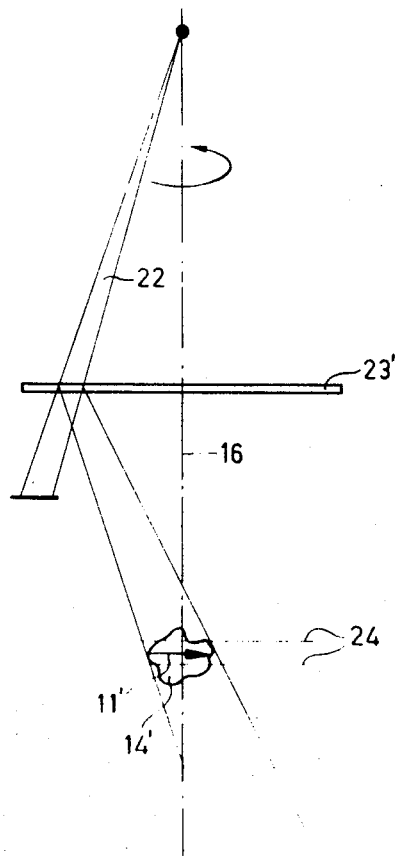
Figure 5:
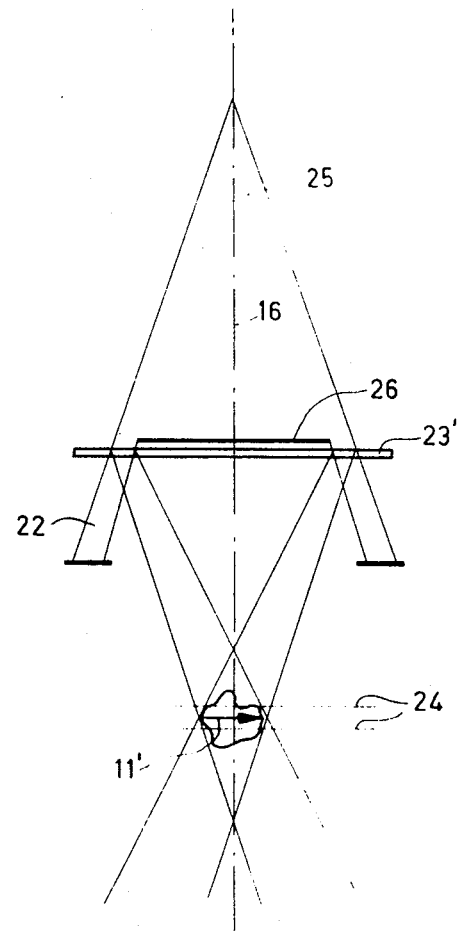

FIG. 1 is a diagrammatic representation of the recording of a sequence of X-ray images from different directions, FIG. 2 is a diagrammatic representation of the geometry to be adhered to, FIG. 3 shows the hologram recording, FIG. 4 shows the hologram reconstruction using the original reference wave which now, however, rotates, and FIG. 5 shows the reconstruction by means of a light cone, the reference waves being limited by a diaphragm.

As in the foregoing, the following description of the method is based on X-ray images, but images formed by particle radiation and light-optical or electronic images can also be processed without restriction by this method of forming a three-dimensional image. Artificial images calculated by computers can also be used in the method according to the invention.

In FIG. 1 an X-ray source is displaced, according to a circular pattern 10, parallel to a film plane 11. In each given position (for example, 12, 13) an X-ray image is recorded of an object 14, so that ultimately a sequence of N X-ray images from different perspectives is obtained. The recording geometry used, such as the distance 15 between the film and the focal plane, the rotary axis 16, the circle radius 17 and hence the layer angle 18 used, must be known and be reproducible. It is sufficient if the reconstruction geometry is true to angle or, at least, true to ratio with respect to the recording geometry. That is, the distances and diameter of the circle may be proportionally reduced or increased. The approximate mean distance 19 between the plane of the circle 10 and the object must also be known.

FIG. 2 shows the overall geometry to be adhered to for correct superimposition of the individual images. An X-ray image 11 is focussed in 11' by a lens 20. 11' should be approximately in the center of the examined part of the layer. Using a diaphragm 21, a range 24 of the depth of focus can be predetermined. The geometry is chosen such that the center of the lens 20 is situated on the edge of the circle 10 with the rotary axis 16 and the radius 17. The film focal plane distance 15 is indicated for the plane 11''. The original recording geometry is thus restored, for example, again with the same layer angle 18. The layer angle 18 can be readily changed by displacement of the lens 20 in a direction transverse to the rotary axis 16. The in-focus imaging plane is now situated, for example, in the image 14' to be formed of the object 14. As a result, the range 24 of the depth of focus can be selected to be much smaller, which inter alia increases the light intensity, thus reducing the exposure times for a hologram.

According to the incoherent method, N lenses would have to be arranged on the circle 10 so as to reproduce the N correspondingly arranged individual images of 11. This large number of lenses can be avoided by means of a simple holographic method. To this end, for example, a photographic plate 23 or a similar storage material is provided between the lens 20 and the depth of focus range 24, perpendicular to the rotary axis 16. A preferably spherical reference wave, departing from a point on the rotary axis 16, illuminates a conic section on the photographic plate. Due to the coherence, the two light waves interfere. The intensity of this interference pattern is recorded by the photographic plate.

For the storage of all N X-ray images, the photographic plate 23 is successively rotated about the axis 16 through an angle $2\pi/N$, in accordance with the angle variation of the X-ray tube during recording. The associated X-ray image, rotated through $2\pi/N$, is brought to position 11. All images thus have the same orientation upon reconstruction. The reference wave 22 and the lens 20 are not changed. After all N X-ray images have thus been holographically stored, the photographic plate is developed (the plate can also be bleached so as to obtain a higher efficiency) and is returned to the original position. If the reference wave 22 is made to rotate about the axis 16, the sub-holograms are time-sequentially reconstructed, so that the exact beam geometry of FIG. 1 is recovered. The image 14' is produced by integration of all N X-ray images (a commonly used value of N is 24) at the location where the object was situated during recording. For the sake of clarity, FIG. 3 shows only the recording geometry. In addition to a laser, producing the object wave and the reference wave, in principle only a holder for the X-ray film 11, a lens 20 having a variable diaphragm 21, and a rotary holder for the photographic plate 23 or a corresponding record carrier are required. FIG. 4 shows the reconstruction by means of the rotary reference wave. The developed photographic plate with the interference pattern, now referred to as the hologram 23', is irradiated by the reference wave 22. The deflected light cone, containing the image information, corresponds exactly to that used for the recording of the hologram (see FIG. 1). The X-ray image which is stored in the special location in the hologram is reproduced in the plane 11'. This image is focussed over a depth of focus range 24 which is given by the selected diaphragm aperture (see 21 in FIG. 3). If the reference wave 22 is made to rotate about the axis 16, the X-ray images of different perspective are time-sequentially reconstructed with the correct orientation. The superimposition of the images at the area where the object was originally situated results in a three-dimensional real image 14' of this object which can be continuously scanned, one layer after the other, by projecting the relevant layer, for example, onto a frosted glass plate or another suitable detector. If the angular velocity of the reference wave is high enough, flicker-free layer images are obtained.

FIG. 5 shows another preferred embodiment. Therein, all reference waves 23 are simultaneously produced by means of a monochromatic light cone 25 and a circular screen 26. The image integration is effected by simultaneous superimposition of all images.

If a different layer angle is used during the recording of the individual images, the holographic storage necessitates only that the lens 20 (see FIG. 2) is displaced perpendicular to the rotary axis 16 so to maintain the changed geometry.

In addition to the described circular blurring patterns, involving a particularly advantageous arrangement, other types of blurring patterns such as linear or hypocycloid patterns can also be used according to the invention.

What is claimed is:

1. A method of forming a three-dimensional image from a sequence of two-dimensional images of an object from different perspectives, comprising the steps of recording a plurality of discrete two-dimensional shadow images of an object on a recording medium located in a plane with a source of penetrating radiation, each said image being formed with the source in a different position, a set of first imaginary lines, one first imaginary line passing through each source position and through a predetermined point of said object, each first imaginary line making an acute angle with a second imaginary line perpendicular to said recording plane and passing through said predetermined point of said object, removing the object and the source, subsequently placing a lens at positions corresponding to each of said source positions, locating the recorded shadow image corresponding to each of said positions at locations wherein the lens focusses two-dimensional secondary images of said recorded images on a given point on said second imaginary line with a depth of focus corresponding to the lens aperture and so as to define a set of third imaginary lines, one third imaginary line passing through each lens position, each corresponding recorded shadow image location, and said given point, each third imaginary line making the same angle with said second imaginary line as the corresponding one of said first imaginary lines makes with said second imaginary line, illuminating each recorded shadow image with coherent radiation, placing a holographic recording medium in the path of the third imaginary lines on a side of the lens remote from the recorded shadow images, additionally illuminating the holographic recording medium with a coherent beam of reference radiation thereby holographically recording each recorded shadow image, and reconstructing the resulting holograms with a beam substantially identical with the reference beam used for recording whereby the individual images holographically reconstructed form an apparent three-dimensional image that is sharply focussed in a plane passing through said given point on said second imaginary line.

2. A method as recited in claim 1, wherein the step of reconstructing the holograms comprises the step of sequentially reconstructing each individual hologram.

3. A method as recited in claim 1, wherein the step of reconstructing the holograms comprises the step of simultaneously reconstructing all of the recorded holograms.

* * * * *

PO-1050 (5/69)

UNITED STATES PATENT OFFICE
CERTIFICATE OF CORRECTION

Patent No. 3,843,225          Dated October 22, 1974

Inventor(s) MANFRED KOCK and ULF TIEMENS

It is certified that error appears in the above-identified patent and that said Letters Patent are hereby corrected as shown below:

ON THE TITLE PAGE

"[30]    Foreign Application Priority Data

Apr. 15, 1972    Germany...............2218384"

should read

--[30]    Foreign Application Priority Data

Apr. 15, 1972    Germany..................P.2218384.2--;

Signed and sealed this 24th day of December 1974.

(SEAL)
Attest:

McCOY M. GIBSON JR.            C. MARSHALL DANN
Attesting Officer              Commissioner of Patents